United States Patent [19]

Kakuta

[11] 4,384,177

[45] May 17, 1983

[54] SWITCH

[75] Inventor: Toshio Kakuta, Osaka, Japan

[73] Assignee: Hosiden Electronics Co. Ltd., Osaka, Japan

[21] Appl. No.: 263,244

[22] Filed: May 13, 1981

[30] Foreign Application Priority Data

May 23, 1980 [JP] Japan .................................. 55/68516
Sep. 5, 1980 [JP] Japan .................................. 55/12327

[51] Int. Cl.[3] ...................... H01H 21/02; H04M 1/04; H01H 19/02

[52] U.S. Cl. .................................. 200/5 R; 200/6 R; 200/6 C; 200/8 A; 200/276; 200/283

[58] Field of Search .................. 200/1 R, 1 A, 1 TK, 200/4.5 R, 6 R, 6 B-6 C, 11 G, 11 K, 11 TW, 8 R, 8 A, 24, 25, 26, 153 L, 15 R, 237-242, 244-247, 252, 275, 276, 283, 284, 303, 50 C

[56] References Cited

U.S. PATENT DOCUMENTS 3,632,911 1/1972 Endou ........................... 200/8 A X
3,651,287 3/1972 Rubenstein ..................... 200/275 X
3,903,383 9/1975 Marker ........................... 200/11 TW
3,920,943 11/1975 Lapointe ......................... 200/276 X
3,978,298 8/1976 Fukuda et al. .................. 200/275 X

FOREIGN PATENT DOCUMENTS 1547061 11/1968 France ............................... 200/276

*Primary Examiner*—J. R. Scott
*Attorney, Agent, or Firm*—Pollock, Vande Sande and Priddy

[57] ABSTRACT

A segment holder is mounted in a casing for rotational movement therein, and a plurality of contact wires extend substantially perpendicularly to the axis of rotation of the segment holder and are spaced from each other along the said axis of rotation, the segment holder being biased to turn in a direction under the resiliency of the contact wires. When a driver connected to the segment holder is actuated from the exterior of the casing, the segment holder is rotated against the biasing force applied thereto to make break electrical contact between the contact wires via a conductive segment(s) mounted on the segment holder.

21 Claims, 30 Drawing Figures

SWITCH

BACKGROUND OF THE INVENTION

1. Field of the Invention

The present invention relates to a switch such for example as a telephone hook switch or a built-in switch structurally associated with an A.C. power supply receptacle or socket.

2. Prior Art

Heretofore, so-called leaf switches have been used as telephone hook switches and power-supply receptacle switches. The leaf switch comprises at least a pair of resilient leaf contacts secured at one end to a holder, the other end of one of the leaf contacts being reciprocably actuatable by a driver into and out of contact with the other leaf contacts for switching operation. With such a leaf switch, the operation of the driver depends largely on the stroke through which the driver is moved, and hence the force with which the leaf contacts are held in contact with each other varies to a relatively large extent in response to a slight variation in the stroke of travel of the driver. The conventional switch is also disadvantageous in that the adjustment of switching timing is difficult to achieve, and reliability is poor as the contacts tend to deteriorate. Another difficulty with the prior arrangement is that efforts to avoid such contact deterioration normally contemplate using a better material for the contact and electroplating the leaf contacts with silver, both of which are expensive.

SUMMARY OF THE INVENTION

It is an object of the present invention to provide a switch which is less costly and more reliable in operation by use of contact wires.

Another object of the present invention is to provide a switch which includes an actuator for driving contact wires which operates stably regardless of changes in its stroke of travel for operation with reliable contact pressure at all times.

Still another object of the present invention is to provide a switch which can select a desired switching timing with ease.

According to the present invention, a segment holder of insulating material is rotatably or movably housed in a casing, the segment holder being of a semi-cylindrical shape and angularly movable about pivot pins located off center or eccentrically with respect to a center of axis of the semicylindrical holder. The segment holder supports on its circumferential surface at least one conductive segment. Contact wires that are fixed at one ends to the casing are pressed at the other ends against the circumferential surface of the segment holder and extend parallel to each other in a direction substantially perpendicular to the axis of rotation of the holder, the contact wires being spaced from each other along such axis of rotation. Where a plurality of conductive segments are attached to the segment holder, they are arranged along the axis of rotation of the holder and angularly spaced from each other about such axis of rotation. Where the segment holder carries a single conductive segment, such a segment is formed so as to have different circumferential widths at different positions on the segment along the axis of rotation. The segment holder has a driver which is actuated by an actuator to cause the segment holder to be angularly moved, whereupon the contact wires are brought into and out of contact with each other via the conductive segment(s) on the segment holder. When the driver is released, the segment holder which is eccentrically supported by the pivot pins is automatically returned to its original position under resiliency of the contact wires pressed against the segment holder. Since the contact wires are thus taken into and out of contact with the segment(s) in response to angular movement of the segment holder, the wires can be thinner than the conventional leaf contacts and hence can be electroplated inexpensively with a reduced amount of silver. Furthermore, the driver can be operated with a substantially constant actuating force regardless of variations in the stroke of travel of the actuator, resulting in operation with reliable contact pressure at all times. Since the contact wires and the segments are held in slidable contact with each other, they are polished at their points of contact to thereby clean dirt away for reliable functioning of the switch.

The segment holder is covered by a sleeve of insulating material having circumferential slots closely spaced from one another along the axis of the sleeve and each receiving one of the contact wires in a close relation to the adjacent ones without direct contact with each other. The contact wires may be supported by a prismatic wire holder, the contact wires extending sideways through the wire holder with one projecting ends serving as terminals. The wire holder is mounted in the casing at a position to close off one end of the casing. Furthermore, the casing is composed of a pair of upper and lower casing members or halves, the lower casing member including a pair of side plates having respective bearings which receive the pivot pins of the segment holder. The upper casing member is combined with the lower casing member to support the segment holder rotatably in the assembled casing.

When the present invention is applied to a switch combined with a power supply receptacle, a casing is provided which has a plug-receiving opening into which projects a driver through a hole in a partition between the opening and a switch mechanism. When a plug is inserted into the opening, the plug actuates the driver to turn or move a segment holder. A pair of side plates are integrally formed with the partition along the plug-in direction, and a member having a front end plate and a bottom plate integrally formed with each other is inserted to extend between the side plates. A wire holder is disposed between the partition, the bottom plate and the side plates at their ends, thereby constituting a closed casing of the switch structure. The side plates have a pair of confronting grooves extending rearwardly and receiving therein a pair of respective pivot pins of the segment holder for angular movement thereof, the segment holder as housed in the casing being prevented from being taken or dropped out of the groove by the front end plate integral with the bottom plate.

DETAILED DESCRIPTION

First, explanations will be given of the case where the present invention is assembled so as to be applicable to such as hook-switches of telephones.

Figure 1:
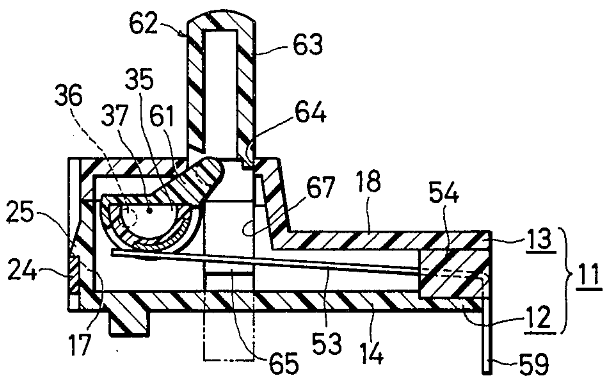
FIG. 1 is a cross-sectional view of a switch according to the present invention.
Figure 2:
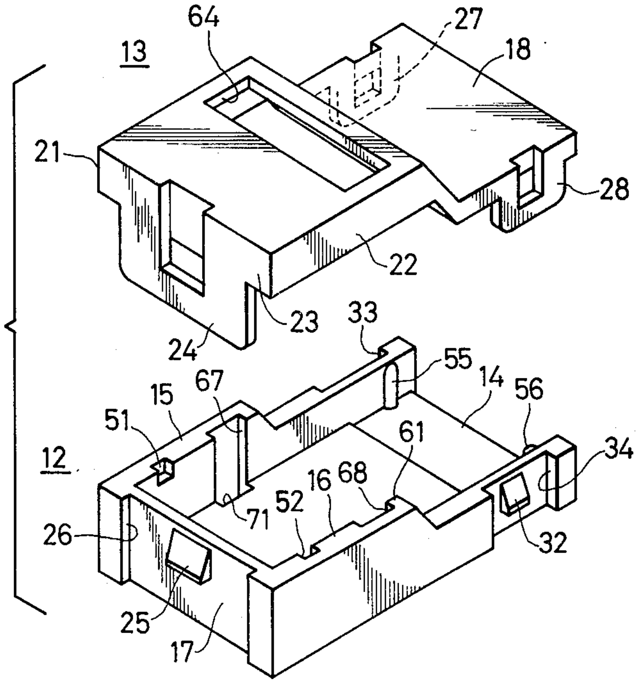
FIG. 2 is an exploded perspective view of a casing of the switch shown in FIG. 1.

As shown in FIGS. 1 and 2, a switch comprises a casing 11 composed of a pair of assembled casing members or halves 12, 13 molded of synthetic resin. The casing member 12 includes a bottom plate 14, a pair of opposite side plates 15, 16 integral with and extending along edges of the bottom plate 14 in perpendicular relation therewith, and an end plate 17 connected integrally with the bottom plate 14 and the side plates 15, 16 at their ends. The side plates 15, 16 include raised portions contiguous to the end plate 17. The casing member 13 is disposed over the casing member 12 and covers the space between the side plates 15, 16 thereof. The casing member 13 includes an upper plate 18 having edge portions held against the upper surfaces of lowered portions of the side plates 15, 16. The upper plate 18 also includes integral side plates 21, 22 and 23 held against the upper surfaces of the raised portions of the side plates 15, 16 and the end plate 17.

An integral U-shaped engaging tongue 24 extends downwardly from the side plate 23 toward the bottom plate 14 and is held in snapping engagement with a projection 25 on the end plate 17, the engaging tongue 24 being guided and received in a shallow recess 26 in an outer surface of the end plate 17. Similarly, a pair of integral U-shaped engaging tongues 27, 28 which extend downwardly from opposite edges of the upper plate 18 remotely from the engaging tongue 24 are held in snapping engagement respectively with a pair of projections 32 (only one shown) on the side plates 15, 16. The side plates 15, 16 have in outer surfaces thereof respective shallow recesses 33, 34 receiving therein the engaging tongues 27, 28, respectively, in order to make the tongues 27, 28 flush with the side plates 15, 16. The casing members 12, 13 are thus assembled together into the casing 11.

Figure 3:
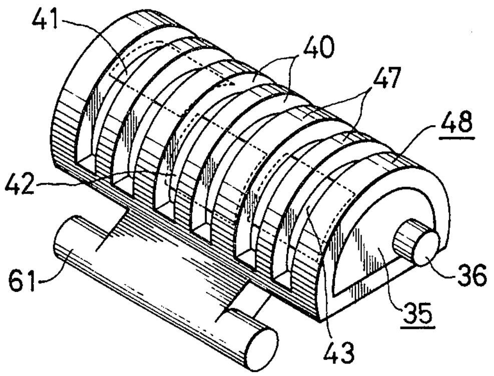
FIG. 3 is a perspective view of a segment holder.
Figure 4:
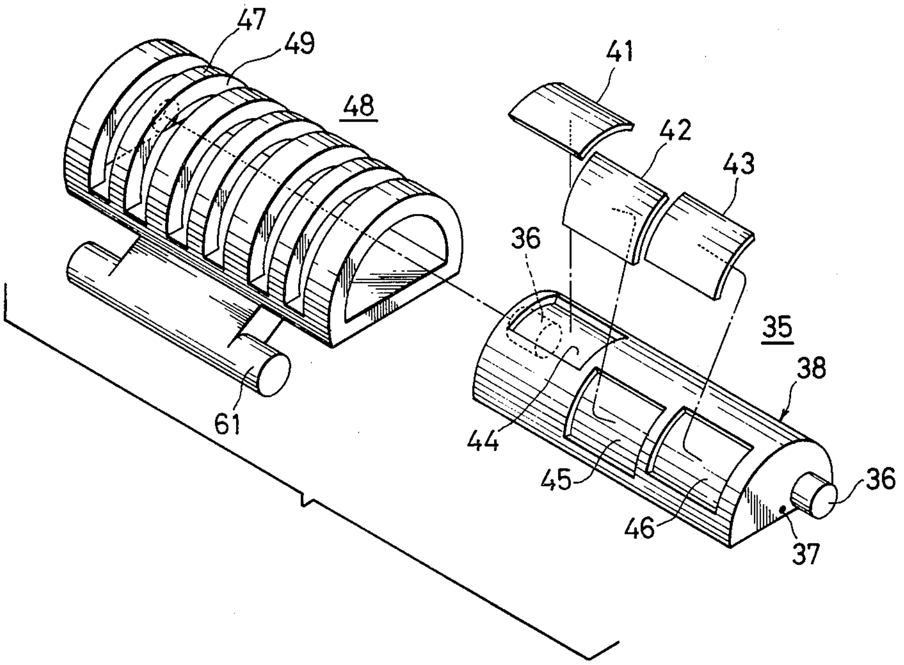
FIG. 4 is an exploded perspective view of the segment holder of FIG. 3.

A segment assembly as shown in FIGS. 3 and 4 is rotatably mounted in the casing 11. The segment assembly comprises a substantially semicylindrical segment holder 35 having on its ends a pair of pivot pins 36, 36 projecting axially therefrom and located off center or eccentrically with respect to the central axis 37 of the segment holder 35. The segment holder 35 supports on a circumferential surface thereof a plurality (three in the illustrated embodiment) of conductive segments 41, 42 and 43 arranged longitudinally of the segment holder 35 and angularly displaced about the central axis 37, each of the segments 41, 42 and 43 being bodily curved into conformity for curvature with the circumferential surface of the segment holder 35. To allow outer surfaces of the segments 41–43 to lie flush with the circumferential surface of the segment holder 35, the segment holder 35 has in its circumferential surface recesses 44, 45 and 46 corresponding positionally to the segments 41–43, respectively, and receiving the segments 41–43 fitted therein. As described later on, a plurality of parallel contact wires disposed closely to one another are pressed at their distal ends against the circumferential surface 38 of the segment holder 35. To prevent such contact wires from contacting each other the segment holder 35 is fitted complementarily into a substantially semicylindrical sleeve 48 having a plurality of circumferential slots 49 spaced axially of the sleeve 48 and defining therebetween a plurality of partitions 47 by which the contact wires are held apart from each other. The slots 49 as paired overlie the segments 41–43 so that the segments 41–43 are exposed respectively through pairs of the slots 49.

Figure 5:
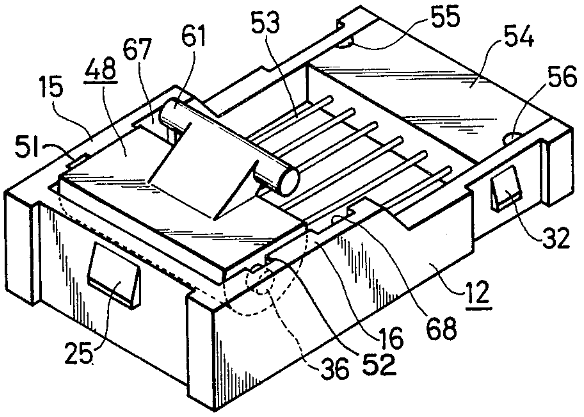
FIG. 5 is a perspective view of the switch of FIG. 1 with a casing half and an actuator removed.

As illustrated in FIGS. 2 and 5, the side plates 15, 16 of the casing 11 have adjacent to the end plate 17 a pair of respective bearing recesses 51, 52 confronting each other and receiving the pivot pins 36, 36 of the segment holder 35 for angular movement of the latter in the casing 11 about the pivot pins 36, 36.

Figure 6:
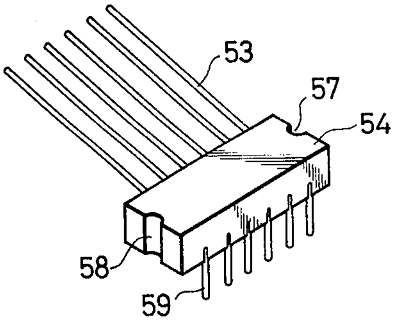
FIG. 6 is a perspective view of contact wires supported by a wire holder.

As illustrated in FIGS. 1 and 5, a plurality of resilient parallel contact wires 53 are disposed relatively closely to each other in the casing 11, the contact wires 53 being resiliently pressed at distal ends thereof against the circumferential surface 38 of the segment holder 35 through the slots 49 with the other ends of the contact wires 53 being secured in position with respect to the casing 11. More specifically, as best shown in FIG. 6, the contact wires 53 have their ends extending through an elongate prismatic wire holder 54 of insulating material and are spaced from each other at equal intervals longitudinally of the wire holder 54. The wire holder 54 is securely mounted in the casing 11 at a position remote from the end plate 17. As shown in FIG. 2, the side plates 15, 16 have a pair of respective ribs 55, 56 facing each other and extending normal to the bottom plate 14. The wire holder 54 has in its ends a pair of grooves 57, 58 (FIG. 6) in which the ribs 55, 56 of the side plates 15, 16 are fitted, respectively. In assembly, the wire holder 54 is first placed in the casing member 12 between the side plates 15, 16 with the ribs 55, 56 being fitted respectively in the grooves 57, 58. Then, the segment assembly is put into the casing member 12 with the circumferential surface 38 of the segment holder 35 facing downwardly toward the bottom plate 14 until the pivot pins 36, 36 are received respectively in the bearing recesses 51, 52. Thereafter, the upper casing half 13 is fixedly engaged with the casing half 12 to hold the pivot pins 35, 36 and the wire holder 54, while allowing the latter to close one end of the casing 11. Accordingly, the contact wires 53 are spaced from each other along the axial direction of the segment holder 35 and are each pressed at their free ends through one of the slots 49 in the sleeve 48 against the circumferential surface 38 of the segment holder 35. The contact wires 53 have extensions which extend outwardly of the casing 11 as terminals 59 which as illustrated project through the wire holder 54 away from the casing member 13 beyond the bottom plate 14 of the casing member 11. As an alternative, the ribs 55, 56 may be formed on the wire holder 54 and the grooves 57, 58 may be formed in the side plates 15, 16.

Figure 7:
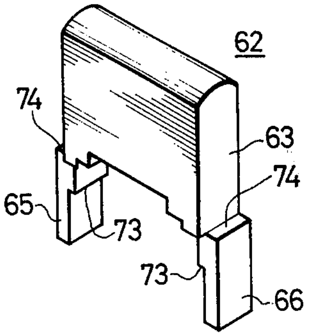
FIG. 7 is a perspective view of an actuator.

As shown in FIGS. 1, 3 and 4, the sleeve 48 has a driver 61 integral therewith and projecting obliquely away from the circumferential surface 38 of the segment holder 35 or disposed opposite to the pivot pins 36 across the central axis of the semicylindrical segment holder 35, the driver being in the form of a rod extending parallel to the segment holder 35. The driver 61 is engageable by an actuator 62 movable into and out of the casing 11 through a rectangular opening 64 (FIGS. 1 and 2) in the upper plate 18 of the casing member 13. The actuator 62 comprises, as illustrated in FIGS. 1 and 7, a body 63 extending through the rectangular opening 64 and a pair of spaced legs 65, 66 projecting integrally from ends of the body 63 and extending downwardly in parallel relation away from the body 63, the legs 65, 66 being inserted movably in a pair of opposed guide slots 67, 68 (FIG. 2), respectively, in the side plates 15, 16 and extending perpendicularly to the bottom plate 14. The bottom plate 14 has a pair of holes 71 (only one shown) disposed in registration with the guide slots 67, 68, respectively, for reception therethrough of the actuator legs 65, 66. Accordingly, the actuator 62 is guided in its movement into and out of the casing 11 by the slots 67, 68 and the holes 71 in which the actuator legs 65, 66 are slidably received.

When the actuator 62 is fully depressed, the legs 65, 66 thereof project downwardly through the holes 71 beyond the bottom plate 14 of the casing member 12, as shown by the dot-and-dash lines in FIG. 1. Such downward movement of the actuator 62 is limited by a pair of stepped portions or stops 73 on the actuator legs 65, 66 at their confronting surfaces, the stops 73, 73 being engageable upon the actuator's being depressed with the bottom plate 14 of the casing member 12 thereby limiting the extend by which the actuator legs 65, 66 project outwardly of the casing 11 beyond the bottom plate 14 thereof. At the connecting portions between the actuator legs 65, 66 and the actuator body 63 are formed a pair of shoulders 74, facing away from the stops 73, 73 and offset outwardly sideways from the actuator body 63. The shoulders 74 are engageable with the upper plate 18 of the casing member 13 adjacent to the rectangular opening 64 to prevent the actuator 62 from being accidentally taken out of the casing 11. In assembly, the actuator 62 is installed into the casing member 12 which has already been equipped with the segment assembly and the wire holder 54, so that the driver 61 is disposed below and held in abutting engagement with the actuator body 63 between the actuator legs 65, 66 which are slidably received in the slots 67, 68 and the holes 71. Then, the casing member 13 is mounted on the casing member 12 with the actuator body 63 inserted through the rectangular opening 64 in the upper plate 18, thereby completing the casing 11. Thus, the segment assembly, the wire holder 45 with the contact wires 53, and the actuator 62 are housed in the casing 11 with the holder 54 closing off the casing 11 at one end thereof.

The switch thus constructed may be used, for example, as a telephone hook switch. Such a hook switch will operate as follows: Before the actuator 62 is depressed, one pair of the contact wires 53 are held in contact with the segment 41 and hence are connected electrically with each other through the segment 41, and the remaining contact wires 53 are kept out of contact with the segments 42, 43 and with each other. When the actuator 62 is depressed, the driver 61 is caused by the actuator body 63 to turn the segment assembly about the pivot pins 36, whereupon another pair of the contact wires 53 are brought into contact with the segment 43 and hence with each other via the segment 43. Continued depression of the actuator 62 causes the segment assembly to turn further, thus allowing still another pair of the contact wires 53 to contact the segment 42 and each other via the segment 42. At this time, the segment 41 is angularly moved out of contact with the first pair of the contact wires 53 which are then brought into contact with the circumferential surface 38 of the segment holder 35, whereupon they become electrically isolated to break their circuit. Upon releasing the actuator 62 of the depressing force, the segment assembly is caused under resiliency of the contact wires 53 to be angularly moved back to its original position as illustrated in FIG. 1.

Figure 8:
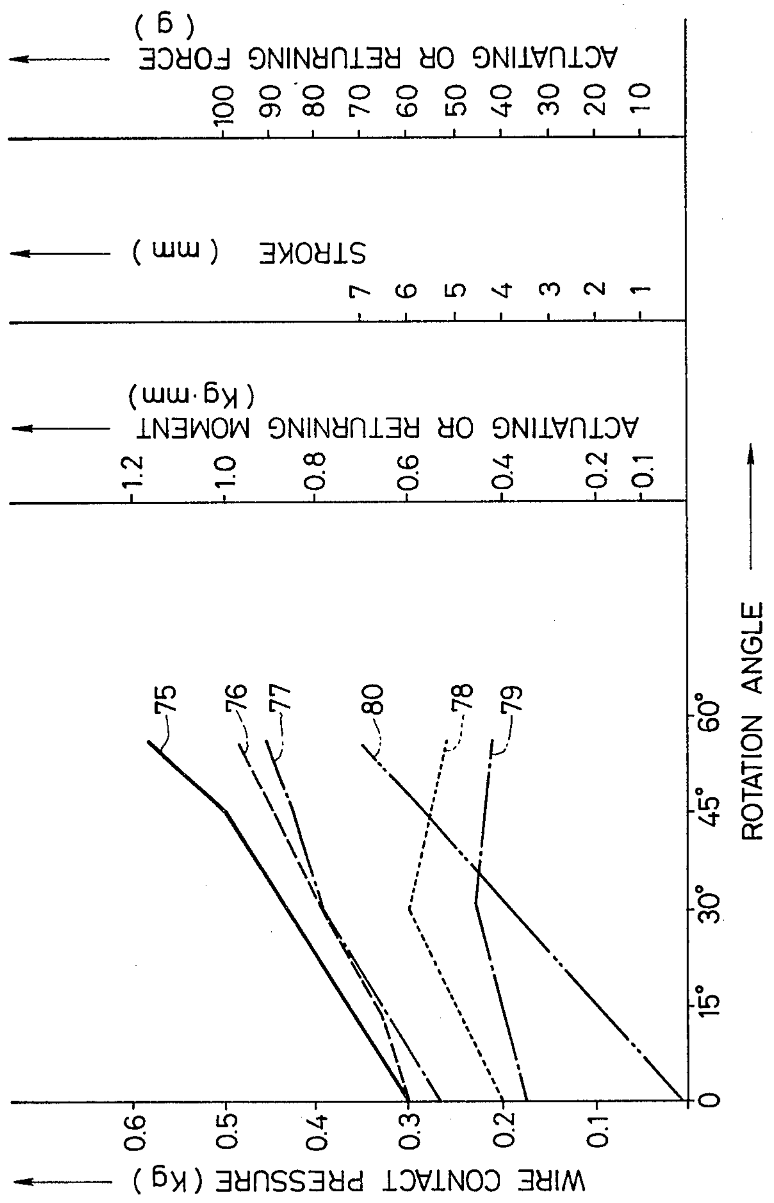
FIG. 8 is a graph indicating the pressure of contact of wires, the actuator stroke, the force required for operating the actuator, and the moment plotted against the angle of rotation of the segment holder.

FIG. 8 shows curves 75, 76, 77, 78, 79 and 80 which respectively indicate the force with which the contact wires 53 are held in contact with the circumferential surface 38, the force with which the actuator 62 is depressed, the torque with which the segment assembly is angularly moved, the force with which the actuator 62 is returned, the torque required to return the segment assembly, and the stroke which the actuator 62 travels, all plotted against the angle through which the segment assembly or the segment holder 35 angularly moves. From the graph, it will be understood that the force required to operate the actuator 62 varies only slightly even when the stroke of travel of the actuator 62 is changed. Stated otherwise, the actuator 62 can travel a relatively large stroke with a substantially constant force, and the force with which the contact wires 53 contact the segments remains substantially unchanged regardless of such a large stroke thereby producing good electrical contact therebetween. Switching timing can be selected easily and correctly by determining the relative angular positions of the segments 41–43. Since the contact wires 53 and the segments 41–43 are kept in slidable contact with each other, they polish each other for automatic removal of dirt or other foreign matter, an arrangement which is called "self-cleaning contact" that gives high reliability in operation.

The number of circuits which are to be switched on and off can be selected as desired by changing the number of combinations of segments and contact wires. Furthermore, since the segments 41–43 are small in size, they can be electroplated with a small amount of silver for improved electrical conductivity. Similarly, the contact wires 53 are thin with a desired cross-sectional shape such as a rectangle or circle, and they can be electroplated with a small amount of silver for depositing a silver layer of sufficient thickness. Thus, the switch according to the present invention can be manufactured less costly for a small contact resistance using a reduced amount of silver deposition.

Figure 9:
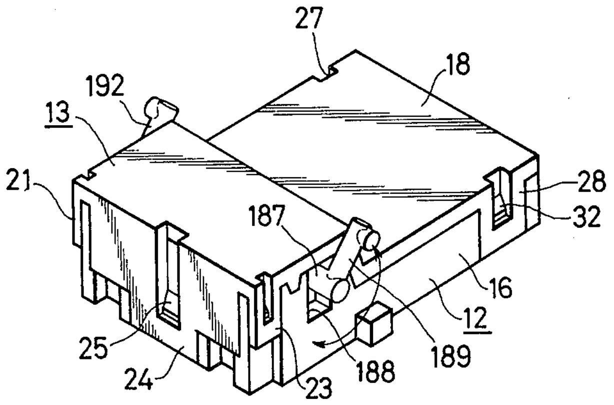
FIG. 9 is a perspective view of a switch according to another embodiment.
Figure 10:
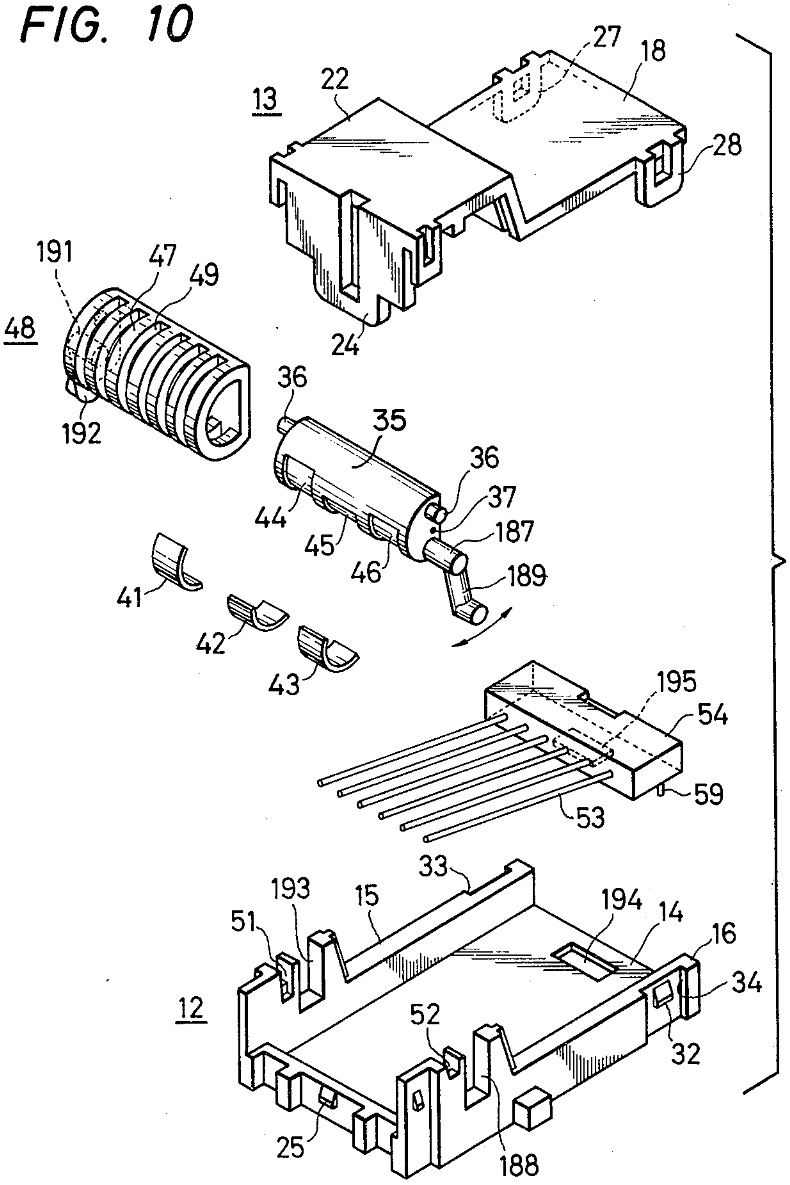
FIG. 10 is an exploded perspective view of the switch illustrated in FIG. 9.

While in the illustrated embodiment the segment assembly is angularly movable by depressing the actuator 62, other arrangements can be used for driving the segment assembly. For example, as illustrated in FIGS. 9 and 10 in which corresponding parts are denoted by like reference numerals in FIGS. 1 and 7, a segment holder 35 has on one end thereof a shaft 187 integral therewith and located diametrically oppositely to a pivot pin 36 across central axis 37, the shaft 187 being received in a notch 188 in a side plate 16 of a casing member 12 and projecting outwardly of the casing. A lever 189 is attached in perpendicular relation to the projecting end of the shaft 187. A sleeve 48 has a similar shaft 191 extending integrally from one end thereof which is opposite to the end of the segment holder 35 having the shaft 187. A lever 192 is attached to the shaft 191 and extends perpendicularly to the shaft 191. The shaft 191 projects outwardly of the casing 11 through a notch 193 in a side plate 15 of the casing member 12. The shafts 187, 191 with the respective levers 189, 192 are positionally held in axial alignment with each other. Actuation of the lever 189 or 192 causes the segment assembly to be angularly moved for successive contacts between the segments 41–43 and the pairs of the contact wires 53. According to this embodiment, a wire holder 54 has a downwardly projecting land 195 (FIG. 10) fitted in a recess 194 in a bottom plate 14 of the casing member 12 for positioning the wire holder 154 against displacement. In the embodiments illustrated in FIGS. 1 and 9, a spring may be employed to assist the segment assembly in returning to its initial position.

Figures 11, 12:
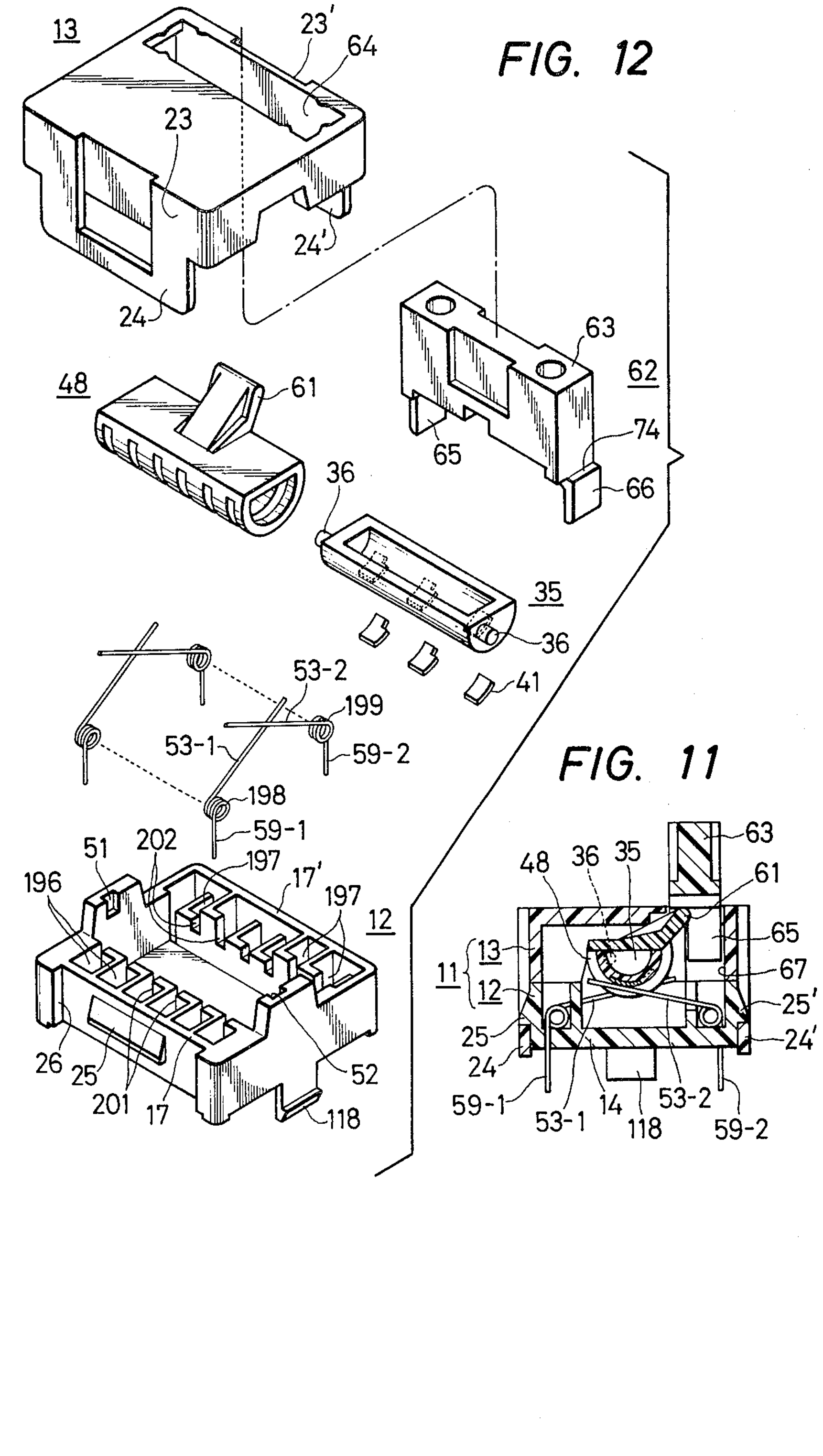
FIG. 11 is a cross-sectional view of a switch in accordance with still another embodiment.
FIG. 12 is an exploded perspective view of the switch of FIG. 11.
Figure 13:
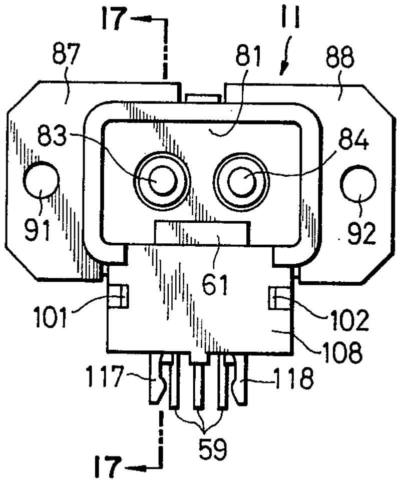
FIG. 13 is a front elevational view of a power-supply receptacle switch to which the present invention is applied.

FIGS. 11 and 12 illustrate a switch according to still another embodiment of the present invention. Like or corresponding parts in FIGS. 11 and 12 are indicated by like or corresponding reference numerals in FIGS. 1 through 7. A casing member 12 has a plurality of contact wire holders 196, 197 arranged along oppositely disposed end plates 17, 17'. Contact wires 53-1, 53-2 of resilient conductive material are centrally coiled at 198, 199 and have portions 53-1, 53-2 and opposite portions 59-1, 59-2. The coils 198, 199 are received respectively in the wire holders 196, 197 with the wire portions 59-1, 59-2 extending outwardly through apertures in a bottom plate 14 of the casing member 12. The wire portions 53-1, 53-2 and 59-1, 59-2 extend at an angle of about 120 degrees, the wire portions 53-1, 53-2 being directed inwardly toward each other or the end plates 17', 17, respectively. The wire portions 53-1, 53-2 are alternately disposed substantially centrally of a casing 11 and spaced from each other in a direction substantially parallel to the end plates 17, 17'. The wire holders 196, 197 have oppositely disposed slits 201, 202, respectively, through which the wire portions 53-1, 53-2 extend and by which the wire portions 53-1, 53-2 are positioned at spaced intervals with respect to each other.

A segment holder 35 is angularly movably supported by a pair of bearings 51, 52 on the casing member 12 and located between the end plates 17, 17' in substantially parallel relation thereto. Another casing member 13 has a pair of confronting end plates 23, 23' from which downwardly project a pair of respective engaging tongues 24, 24' held in snapping engagement with a pair of corresponding projections 25, 25' on the end plates 17, 17' of the casing member 12, thus securely combining the casing members 12, 13 into the casing 11. When assembled in the casing 11, the wire portions 53-1, 53-2 are held in abutting engagement with the segment holder 35 at its downward circumferential surface as illustrated in FIG. 11. When the actuator 62 is depressed, the segment holder 35 is angularly moved to make or break electrical connection between a selected pair of contact wires. According to this embodiment, since the wire portions 53-1, 53-2 are resiliently urged by the coils 198, 199 mounted in the wire holders 196, 197, sufficient resiliency will be obtained even though the wire portions 53-1, 53-2 are shortened. For attachment to other structures for electrical connection, the casing member 12 has a pair of hooked legs 118 (only one shown) engageable with such structures.

FIGS. 13 through 26 illustrate another switch according to the present invention, which is structurally associated with a power supply receptacle or socket. As shown in FIGS. 13 through 17, the switch has a casing 11 including in its upper portion (FIG. 17) an opening 81 for receiving a plug (not shown), the opening 81 being closed at one end by a bottom 82 supporting a pair of parallel terminal pins 83, 84 which extend into the plug-receiving opening 81. The terminal pins 83, 84 project away from the opening 81 through the bottom 82 and are staked thereon. A pair of power supply terminals 85, 86 are secured to the pins 83, 84, respectively, against the bottom 82. A pair of attachment flanges 87, 88 are formed on opposite sides of the casing 11 integrally therewith and have a pair of central attachment holes 91, 92, respectively.

Figure 18:
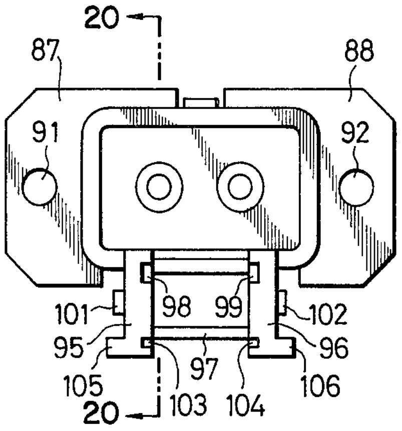
FIG. 18 is a front elevational view of a casing of the switch of FIG. 13.
Figure 19:
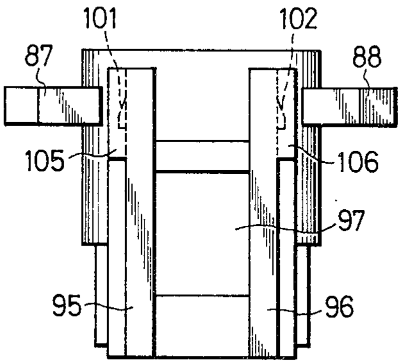
FIG. 19 is a bottom view of the casing shown in FIG. 18.
Figure 20:
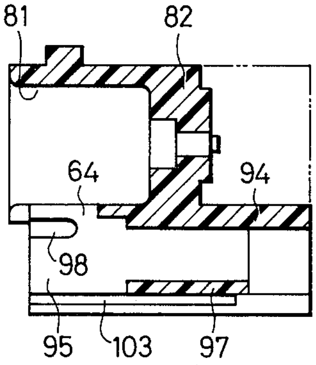
FIG. 20 is a cross-sectional view taken along line 20—20 of FIG. 18.
Figure 21:
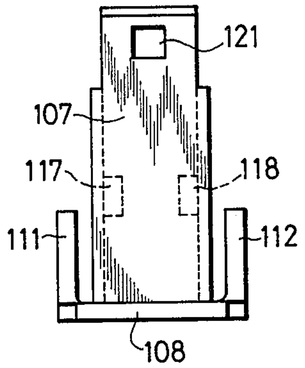
FIG. 21 is a front elevational view of a bottom plate having an end plate of the switch of FIG. 13.

The casing 11 includes in its lower portion (FIG. 17) a switch mechanism 93 having a partition 94 and a pair of side walls 95, 96 projecting integrally from opposite marginal edges of the partition 94 and extending parallel to each other in directions in which the plug is insertable into and removable from the opening 81. A connector plate 97 extends between the side walls 95, 96 in confronting relation to the partition 94. The side walls 95, 96 have therein a pair of relatively short grooves 98, 99 extending in confronting relation rearwardly from the front ends of the side walls 95, 96 adjacent to the open end of the opening 81, as shown in FIGS. 18 and 20. The side walls 95, 96 also has a pair of respective projections 101, 102 disposed on outer surfaces of the side walls 95, 96 in substantially corresponding relation to the grooves 98, 99, and having tapered surfaces which are gradually raised rearwardly (FIGS. 18 and 19). A pair of relatively long guide grooves 103, 104 are formed in the side walls 95, 96 at their confronting surfaces and extending along lower edges thereof up to the front ends of the side walls 95, 96, the guide grooves 103, 104 being located just next to the connector plate 97. The side walls 95, 96 also include a pair of respective guides 105, 106 directed away from each other and disposed adjacent to the projections 101, 102, respectively.

Figure 14:
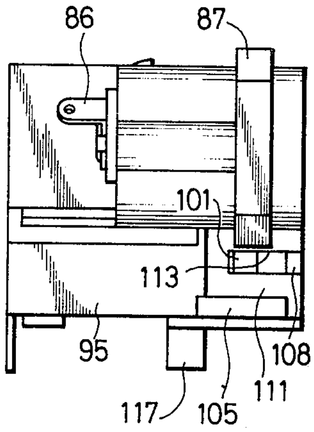
FIG. 14 is a side elevational view of the switch shown in FIG. 13.
Figure 15:
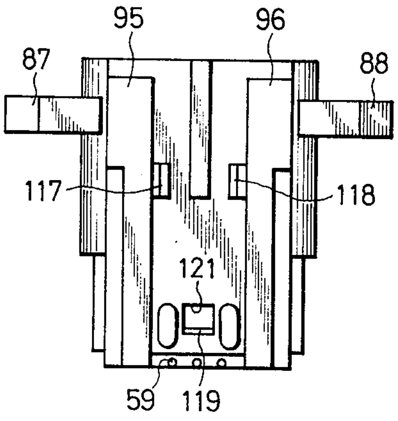
FIG. 15 is a bottom view of the switch of FIG. 13.
Figure 22:
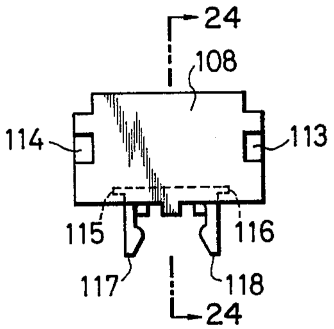
FIG. 22 is a front elevational view of the bottom plate shown in FIG. 21.
Figure 23:
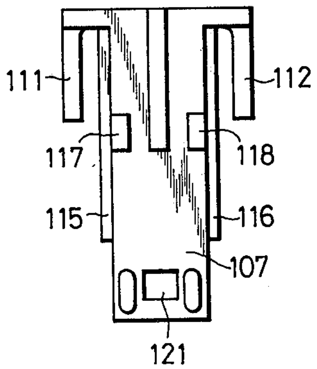
FIG. 23 is a bottom view of the bottom plate of FIG. 21.
Figure 24:
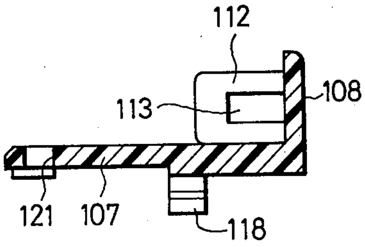
FIG. 24 is a cross-sectional view taken along line 24—24 of FIG. 22.
Figure 25:
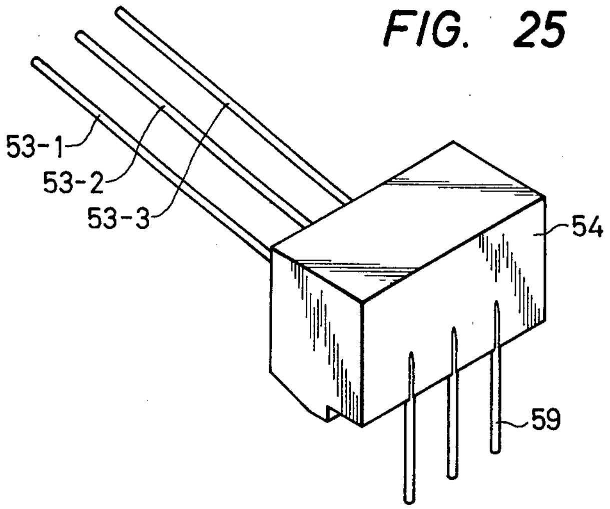
FIG. 25 is a perspective view of a wire holder which supports contact wires, of the switch illustrated in FIG. 17.

A bottom plate 107 is fitted between the side plates 95, 96 to accommodate the switch mechanism 93 between the partition 94 and the bottom plate 107. As best shown in FIG. 21 to 24, the bottom plate 107 is substantially rectangular and has a front end plate 108 (FIGS. 17 and 24) extending at a right angle and having a width slightly larger than that of the bottom plate 107, the end plate 108 having a pair of supports 111, 112 extending from its side ends in a direction perpendicular thereto and parallel to the bottom plate 107. The supports 111, 112 have therein respective holes 113, 114 (FIGS. 14, 22 and 24). The bottom plate 107 has a pair of guide ridges 115, 116 along its side edges, respectively, and a pair of attachment members 117, 118 on its marginal edges, respectively, substantially at a central position thereof, the attachment members 117, 118 serving to attach the switch assembly to another structure. In assembling operation, the guide ridges 115, 116 on the bottom plate 107 are inserted into the grooves 103, 104, respectively, in the side plates 95, 96, and the supports 111, 112 sandwich the side plates 95, 96 therebetween at their outer surfaces, with the projections 101, 102 on the side plates 95, 96 fitting in the holes 113, 114 in the supports 111, 112. The bottom plate 107 is thus attached to the side plates 95, 96. When attached, the supports 111, 112 are held in place between the guides 105, 106 and outer extensions of the partition 94.

Figure 16:
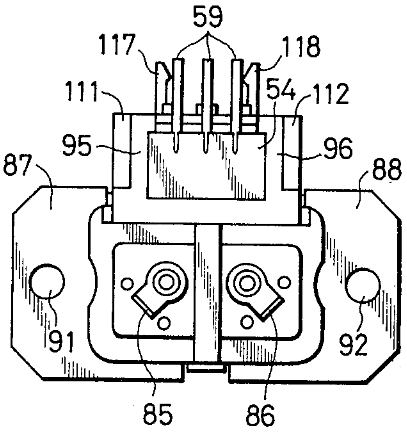
FIG. 16 is a rear elevational view of the switch of FIG. 13.
Figure 17:
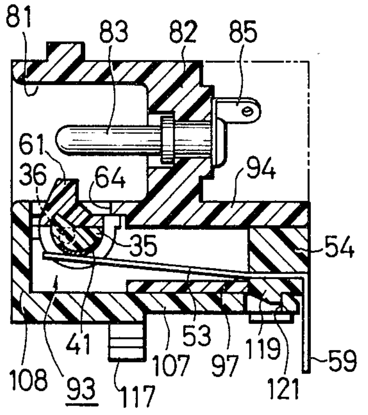
FIG. 17 is a cross-sectional view taken along line 17—17 of FIG. 13.

The switch mechanism 93 includes a plurality of contact wires 53-1, 53-2, 53-3 extending substantially parallel to a direction in which the plug is insertable or removable, and spaced from each other in a direction in which the terminal pins 83, 84 are spaced from each other, each of the contact wires being supported at one end thereof by a wire holder 54 which is substantially prismatic in shape and is disposed rearwardly in the switch mechanism 93 as shown in FIGS. 16 and 17. The contact wires 53-1, 53-2, 53-3 extend laterally through the wire holder 54 in parallel relation to each other and have projecting end portions bent substantially perpendicularly downwardly (FIG. 25) and serving as terminals 59. The wire holder 54 has in its side from which the terminals 59 project grooves (not shown) in which portions of the terminals 59 are fitted in place. The contact wires 53-1, 53-2, 53-3 as assembled in the switch mechanism 93 extend slightly obliquely from the wire holder 54 toward the partition 94 as illustrated in FIG. 17. The wire holder 54 includes a side extending substantially parallel to the array of the contact wires and held against the partition 94 and an opposite side having a central tapered projection 119 the height of which is gradually increased as it approaches the terminals 59, the projection 119 engaging in a hole 121 in the bottom plate 107 for secure attachment of the wire holder 54. Thus, the wire holder 54 is fitted in a rear opening defined by the partition 94, the side plates 95, 96, and the bottom plate 107 and is locked in position by the projection 119 against accidental dropping off of the switch assembly.

Figure 26:
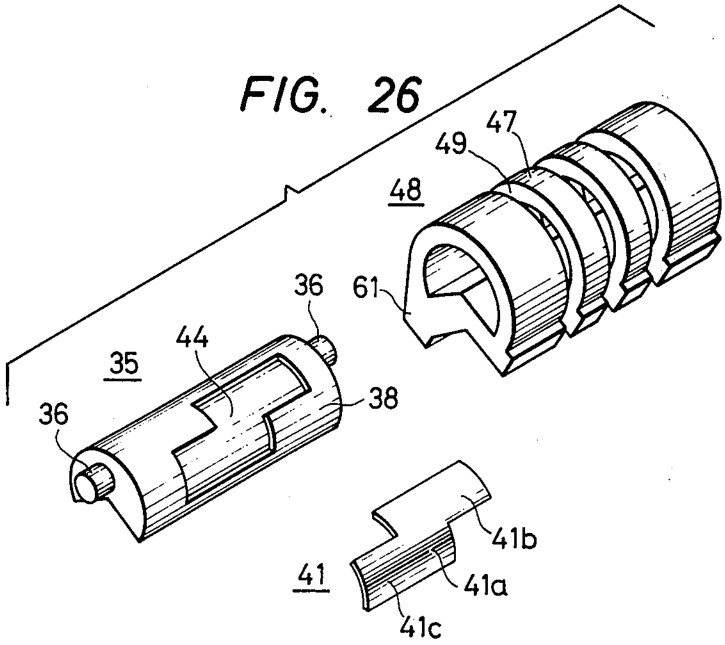
FIG. 26 is an exploded perspective view of a segment holder of the switch of FIG. 17.

The switch mechanism 93 also includes a segment holder 35 mounted for rotatable movement and having a segment 41 against which the contact wires 53-1, 53-2, 53-3 are pressed. The segment holder 35 includes a driver 61 which projects into the plug-receiving opening 81. When the plug is inserted into the opening 81, the driver 61 is actuated to cause the segment holder 35 to turn, thereby making or breaking electrical contact between the contact wires 53-1, 53-2, 53-3 through the segment 41. As illustrated in FIG. 26, the segment holder 35 is part-cylindrical in shape and is cross-sectionally 220°-segmental, the segment holder 35 carrying the segment 41 on its circumferential surface 38. The segment holder 35 is complementarily housed in a sleeve 48 which is similar in contour to the segment holder 35. The driver 61 is integrally formed with the sleeve 48 to extend in a tangential direction from a marginal portion of the radial surface of the sleeve 48.

A pair of pivot pins 36, 36 project from ends of the segment holder 35 and are located off center or eccentrically with respect to the central axis of the segment holder 35. The pivot pins 36, 36 are received in the grooves 98, 99 to support the segment holder 35 rotatably between the side plates 95, 96, with the driver 61 projecting into the plug-receiving opening 81, as described, through a rectangular opening 64 in the partition 94. The segment 41 is fitted complementarily in a shallow recess 44 in the circumferential surface 38 of the segment holder 35 (FIG. 26). The segment 41 comprises a rectangular central portion **41*a* and a pair of end portions 41*b*, 41*c* extending away from each other from opposite ends of the central portion 41*a*. The central portion 41*a* and the end portions 41*b*, 41*c* are arranged parallel to the axis of the segment holder 35 and all have a radius of curvature which is the same as that of the circumferential surface 38 of the segment holder 35. The sleeve 48 has slots 49 defined by partitions 47 and each receiving therein one of the contact wires 53-1, 53-2, 53-3**.

The segment holder 35 is biased under the resiliency of the contact wires 53-1, 53-2, 53-3 to be shifted toward the plug-receiving opening 81. With the pivot pins 36, 36 located eccentrically with respect to the central axis of the segment holder 35, the driver 61 is maintained at all times to project into the plug-receiving opening 81. A coil spring (not illustrated) may be added to assist the segment holder 35 in being thus biased. With the driver 61 projecting into the plug-receiving opening 81, the contact wires 53-1, 53-2, 53-3 are held in contact with the segment portions **41*b*, 41*a*, respectively, and hence are in electrical contact with each other via the segment 41, while on the other hand the contact wire 53-3 is kept out of contact with the segment 41 and hence out of electrical contact with the contact wire 53-2**.

As the plug is inserted into the plug-receiving opening 81, contacts in the plug come into electrical contact with the terminal pins 83, 84. At the same time, the driver 61 is pushed by the plug thus inserted to turn the segment holder 35 about the pivot pins 36, 36 in a clockwise direction as shown in FIG. 17, whereupon the segment 41 is angularly moved out of contact with the contact wire 53-1 and the segment portions **41*a*, 41*c* are caused to come into contact with the contact wires 53-2, 53-3, respectively. The contact wires 53-2, 53-3 now come into electrical contact with each other via the segment 41. Thus, the contact wires 53-1, 53-3 are switched on and off with respect to the contact wire 53-2**.

Such switching operation can be effected smoothly without the parts being subjected to undue stresses as it depends upon sliding contact between the segment 41 and the contact wires which is caused by angular movement of the segment holder 35. When the plug is pulled out of the opening 81, the segment holder 35 is turned counterclockwise in FIG. 17 under the biasing force of the contact wires 53-1, 53-2, 53-3 (or these contact wires plus the biasing coil spring) into the initial position as shown in FIG. 17. The segment holder 35 is stopped against excessive turning movement when an edge portion of the sleeve 48 which is located thereacross opposite to the driver 61 engages a rear edge of the hole 64.

With such an arrangement, the segment holder 35 and the wire holder 54 can easily be mounted in the casing 11 simply by inserting the pivot pins 36, 36 of the segment holder 35 into the grooves 98, 99, and fitting the wire holder 54 in between the side plates 95, 96 with the bottom plate 107 mounted between the side plates 95, 96. The segment 41 and the contact wires 53-1, 53-2, 53-3 as assembled are prevented from exposure to the exterior so that no dirt or dust is allowed to adhere to the area where the segment contacts the wires. The wire holder 54 may be mounted on the side plates 95, 96 and the bottom plate 107 after the bottom plate 107 has been attached to the side plates 95, 96.

Figure 27:
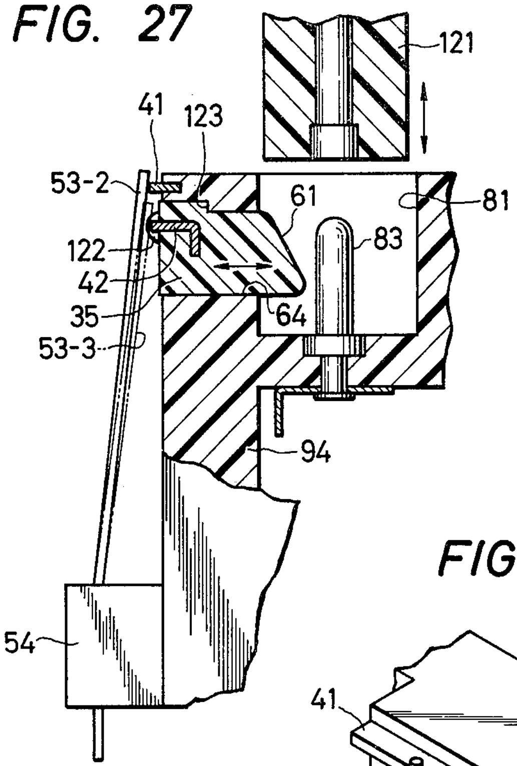
FIG. 27 is a cross-sectional view of another power-supply receptacle switch in which the present invention is incorporated.
Figure 28:
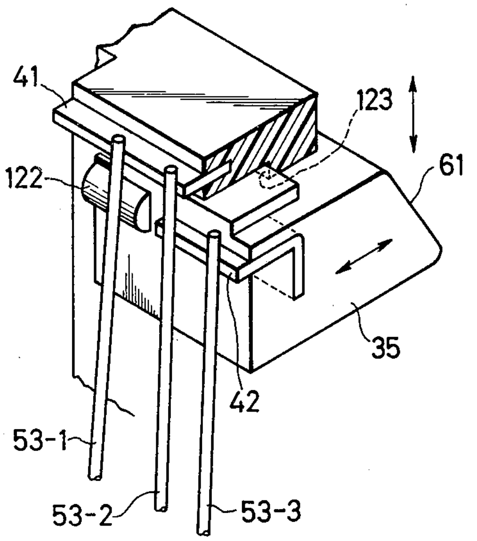
FIG. 28 is an enlarged fragmentary perspective view of a portion of the switch of FIG. 27.

While in the foregoing arrangement the segment holder is angularly moved for switching operation, the segment holder may be arranged to be displaced rectilinealy for switching operation. For example, as illustrated in FIGS. 27 and 28, a segment holder 35 is received in an opening 64 in a partition 94 between a plug-receiving opening 81 and a switching mechanism, the segment holder 35 including a driver 61 projecting into the plug-receiving opening 81. When a plug 121 is inserted into the plug-receiving opening 81, the driver 61 is pushed by the plug 121 to move the segment holder 35 leftwards in FIG. 27. A conductive segment 41 is embedded in the partition 94 and is located forwardly of the opening 64 in the partition 94 and remotely from the plug-receiving opening 81. A ridge 122 is mounted on the segment holder 35 at its surface remote from the plug-receiving opening 81 and extends parallel to the segment 41. A conductive segment 42 is embedded in the segment holder 35 and includes an exposed portion held in line with the ridge 122 as shown in FIG. 28. Contact wires 53-1, 53-2 extend over the segment 41, while a contact wire 53-3 terminates short of the segment 41. With the plug 121 not inserted in the plug-receiving opening 81, the contact wires 53-1, 53-2 are disposed on the segment 41 and the contact wire 53-3 is disposed on the segment 42. When the plug 121 is introduced into the plug-receiving opening 81, the segment holder 35 is moved toward the contact wires. Such movement causes the segment 42 to project beyond the segment 41, whereupon the contact wire 53-2 is lifted out of contact with the segment 41, and the contact wires 53-2, 53-3 are now disposed on the segment 42. The ridge 122 serves to bias the contact wire 53-1 to an extent such that all of the contact wires 53-1, 53-2, 53-3 are biased to substantially the same degree while being actuated for uniform mechanical characteristics thereof through repeated switching operations. As the plug 121 is removed from the plug-receiving opening 81, the segment holder 35 is displaced back toward the opening 81 under the resiliency of the contact wires 53-1, 53-2, 53-3 until the segment holder 35 engages a stop 123 on the partition 94 projecting into the opening 64.

The contact wires 53, 53-1, 53-2, 53-3 preferably comprise wire-shaped resilient members such as piano wires, stainless steel wires, or of Cu-Ti alloy or Be-Cu alloy, which are heat resistant and have improved mechanical characteristics such as modulus of elasticity and modulus of rigidity, the wires being coated on their surface with a layer of good conductivity as of Cu, Ag, Au, such as through electroplating.

Figure 29:
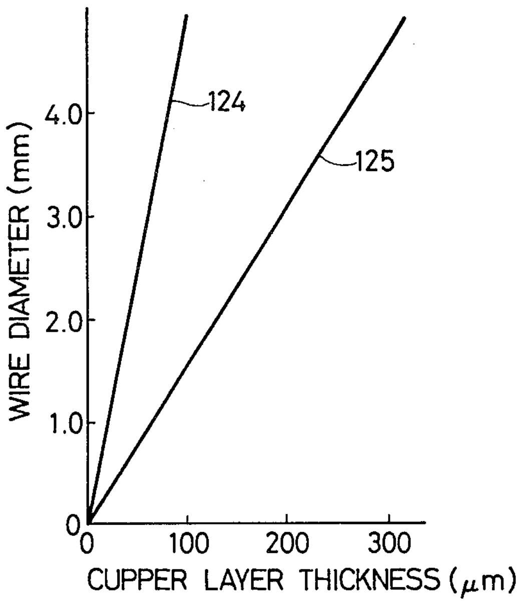
FIG. 29 is a graph showing the relationship between the thickness of a copper layer and the diameter of a contact wire for certain conductivities thereof.
Figure 30:
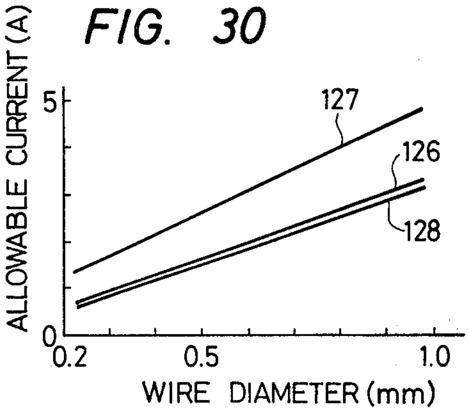
FIG. 30 is a graph showing the relationship between the diameter and current-carrying capacity of a contact wire.

As an example, a steel wire of high carbon content for use as springs may be used which is electroplated with pure copper. Wires thus prepared having 15% of IACS conductivity (1) and 30% of IACS conductivity (2) were measured for relationship between the wire diameter and the thickness of deposited layer of copper, the results being shown in FIG. 29 wherein rectilinear lines 124, 125 are plotted, respectively. To obtain 30% of IACS conductivity with a steel wire of high carbon content having a diameter of 0.6 mm, the copper layer deposited should have a thickness of approximately 40 μm. The steel wires (1), (2) of high carbon content thus electroplated with pure copper were measured for electrical and mechanical properties, which are compared with those of wires of brass, phosphor bronze, and beryllium copper as shown in Table 1. As understood from Table 1, the conductivities of the wires (1), (2) are 13–15 IACS % better than the conductivity of the wire of phosphor bronze. The wires (1), (2) are good in anticorrosion ability, and better in heat resistance than brass, approaching beryllium copper. As to modulus of elasticity indicative of springy characteristics, the wires (1), (2) are of 20,500 $Kg/mm^2$ and 18,000 $Kg/mm^2$, respectively, better than the wires of brass, beryllium copper and phosphor bronze, the modulus of elasticity of the phosphor bronze wire being 11,000 $Kg/mm^2$. Since the wires (1), (2) have smaller specific gravities than the others, lighter switches can be fabricated using these wires (1), (2). The wires (1), (2) were also measured for relationship between allowable currents and diameters, the results being shown in FIG. 30 as lines 126, 127, respectively. Both of the wires (1), (2) have an allowable temperature of 130° C. which is greater than that of the phosphor bronze wire which is 100° C. The wire of phosphor bronze was also tested for relationship between allowable temperatures and diameters, the results being plotted as a line 128 in FIG. 30. From a comparison between the lines 126, 127 and the line 128, the wires (1), (2) have higher allowable currents than that of phosphor bronze.

TABLE 1

| | Properties | | | | | | |
|---|---|---|---|---|---|---|---|
| Materials | Conductivity IACS % | Tensile Strength $Kg/mm^2$ | Allowable Temperature °C. | Modulus of rigidity $Kg/mm^2$ | Modulus of elasticity $Kg/mm^2$ | Maximum design stress $Kg/mm^2$ | Specific gravity |
| Cu—plated steel | 15 | 180 or higher | 130 | 6,800 | 25,000 | 70 | 7.9 |

TABLE 1-continued

| | Properties | | | | | | |
|---|---|---|---|---|---|---|---|
| Materials | Conductivity IACS % | Tensile Strength $Kg/mm^2$ | Allowable Temperature °C. | Modulus of rigidity $Kg/mm^2$ | Modulus of elasticity $Kg/mm^2$ | Maximum design stress $Kg/mm^2$ | Specific gravity |
| (1) Cu—plated steel | 30 | 160 or higher | 130 | 4,800 | 18,000 | 50 | 8.1 |
| (2) Brass | 25 | 70 or higher | 80 | 4,000 | 11,000 | 23 | 8.5 |
| Phosphor bronze (3rd grade) | 13–15 | 95 or higher | 100 | 4,500 | 11,000 | 40 | 8.8 |
| Beryllium copper (8/4 hardness) | 25–30 | 130 or higher | 150 | 5,000 | 13,000 | 50 | 8.2 |

Where a contact wire is made of phosphor bronze, it has an increased degree of hardness, and hence the surface hardness of an electroplated layer of Ag, Au, or the like, if sufficiently thin, may on its face be analogous to that of the wire metal material itself rather than that of the electroplated layer. Therefore, it is necessary to have a thick electroplated layer or to electroplate the foundation of the wire with Cu to obtain better contact material. However, no such foundation electroplating is necessary with steel wires of high carbon content electroplated with pure copper.

Assuming that the concentrated resistance is Rc and the boundary resistance is Rt, the contact resistance can be expressed as $R=Rc+Rt$. The concentrated resistance Rc can be given by the following formula:

$$Rc = \frac{(\rho_1 + \rho_2)\sqrt{\pi Pm}}{4L(n/L)o} W^{0.9} \quad (1)$$

where $\rho_1$, $\rho_2$ are resistivities of contacting materials, Pm is a hardness expressed by Vickers hardness, L is the diameter of an area of contact, W is a load (0.1 Kg$\leqq$W$\leqq$100 Kg), and (n/L)o is the number of severances at the center line of a roughness curve.

With the foregoing contact wires of high carbon content electroplated with pure copper, $\rho$ and Pm are small as compared with those of the phosphor bronze wire, and L is greater than that of the phosphor bronze provided the load remains unchanged, as the foundation is a Cu layer. Therefore, it is apparent from the formula (1) that the concentrated resistance Rc of the wires of the invention is smaller than that of the wire of phosphor bronze.

Contacts for switches have conventionally been successful to improve either mechanical or electrical characteristics. However, contact wires comprising a resilient wire material coated with a layer of good conductivity are good in both mechanical and electrical characteristics. More specifically, such a contact wire comprises a body of resilient material having good mechanical characteristics integrally coated on its surface including areas of contact with a layer of good conductivity or good electrical characteristics, so that the resulting product is good in both mechanical and electrical characteristics. Heretofore, an electroplated layer on the surface of a wire material has been deposited for stabilized contact at contacting areas and the current that flows across the contacts depends largely on the characteristics of the base metal on which the layer is electroplated. The contact wire of the invention, however, allows the current to flow along the surface of the wire which has good electrical characteristics, with the result that the overall electrical characteristics of the contact wire are improved.

What is claimed is:

1. A switch comprising:

a casing;

a segment holder fabricated of an insulating material and mounted for rotation in said casing, said segment holder being substantially semicylindrical in shape and having a circumferential surface whose cross section is an arc of a circle, and the axis of rotation of said segment holder being eccentrically displaced from the concentric axis of said circumferential surface;

at least one conductive segment mounted on said circumferential surface of said segment holder, a surface of said conductive segment occupying at least a part of said circumferential surface;

a plurality of contact wires fixedly supported by said casing so as to extend therefrom in a direction perpendicular to said axis of rotation of said segment holder, said contact wires being arranged in spaced relation to one another along said axis of rotation, one end of each of said contact wires being resiliently pressed against said circumferential surface of said segment holder to bias the rotational motion of said segment holder, and the other ends of said contact wires protruding outside said casing to serve as terminals; and a driver connected to said segment holder for receiving an external force from the outside of said casing to rotate said segment holder against the biasing force of said contact wires, thereby to make or break electrical contact between said contact wires through said at least one conductive segment.

2. A switch according to claim 1, said driver being disposed opposite to said axis of rotation relative to said concentric axis of said semicylindrical segment holder.

3. A switch according to claim 1, said driver being disposed at the same side as said axis of rotation with respect to said concentric axis of said semicylindrical segment holder.

4. A switch according to claim 1, 2 or 3, including a wire holder comprising a block of insulating material, said contact wires extending laterally through said block.

5. A switch according to claim 4, said wire holder being attached to said casing so as to close off an opening thereof.

6. A switch according to claim 5, said contact wires having ends projecting out of said casing from said wire holder, said projecting ends being bent substantially at a right angle against an end surface of said block and serving as said terminals.

7. A switch according to claim 1 wherein each of said contact wires has a coiled portion adjacent to said casing.

8. A switch according to claim 1 wherein said contact wires extend alternately in opposite directions.

9. A switch according to claim 8 wherein each of said contact wires includes a coiled portion, said casing comprising a plurality of holder compartments formed inside said casing integrally therewith for housing said coiled portions of said contact wires, respectively.

10. A switch according to claim 9 wherein each of said holder compartments has a slit through which one of said contact wires extends to said segment holder, each of said slits serving to fixedly position a respective one of said coiled portions in a respective one of said holder compartments.

11. A switch according to claim 1, 2, 3, 7 or 8, including a sleeve similar in contour to said segment holder and complementarily accommodating said segment holder therein, said sleeve having slots extending circumferentially and spaced axially of the sleeve by partitions therebetween, each of said slots receiving one of said contact wires which are prevented from coming into contact with each other by said partitions.

12. A switch according to claim 11, said driver being connected to said sleeve.

13. A switch according to claim 1, 2, 3, 7 or 8, including a plurality of conductive segments arranged on said circumferential surface substantially parallel to said concentric axis and angularly displaced from each other.

14. A switch according to claim 13, said contact wires being held in pairs against each of said conductive segments.

15. A switch according to claim 1, 2, 3, 7 or 8, said conductive segment being singular in number and having varying dimensions in the circumferential direction of said segment holder.

16. A switch according to claim 1, 2, 3, 7 or 8, each of said contact wires comprising a resilient core coated integrally on its surface with a layer of good conductivity such that a greater current can flow through said layer than through said resilient core.

17. A switch according to claim 1, 2, 3, 7 or 8, said casing comprising a pair of casing members, one of which has a pair of bearings adjacent to an interface between said casing members, said axis of rotation of the segment holder being defined by pivot pins extending from opposite ends of said segment holder and rotatably supported in said bearings.

18. A switch according to claim 1, 2, 3, 7 or 8, where said casing is substantially box-shaped, a receptacle box formed on said casing and having an opening for receiving a plug in a direction substantially perpendicular to said axis of rotation of said segment holder and parallel to the extension of said contact wires, a partition located between said casing and said receptacle box, said partition having an aperture therein through which said driver partially extends into said receptacle box so that said driver can be actuated by insertion of said plug into said opening thereby to rotate said segment holder, said receptacle box including power supply terminal pins which extend toward said opening for electrical connection with said plug.

19. A switch according to claim 18 including a pair of parallel side plates extending integrally from said partition at opposite edges thereof remotely from said receptacle box in a direction parallel to the direction of insertion and removal of said plug and perpendicular to said partition, a bottom plate having an integral front end wall standing perpendicularly thereto at a front end thereof, and a wire holder for fixedly supporting said contact wires, said bottom plate being mounted between said side plates such that said bottom plate closes one end of a space between said side plates in a direction parallel to said partition, and said front end wall and said wire holder close the other two ends of said space between said side plates, thereby forming said casing for said segment holder and said contact wires.

20. A switch comprising:

- a casing having a through-hole formed in a side-wall thereof;
- a segment holder fabricated of an insulating material and slidably fitted into said through-hole so as to be linearly movable inwardly and outwardly in said through-hole, said segment holder having an inner end face and an outer face respectively facing inside and outside of said casing;
- at least one conductive segment mounted on said inner face of said segment holder, said conductive segment having an elongated shape lying on said inner end face of said segment holder and having a substantially uniform height above said inner end face;
- at least one stationary conductor having an elongated shape mounted on an inner surface of said side-wall of said casing adjacent to said segment holder, said stationary conductor being arranged in parallel to said conductive segment such that said stationary conductor and said conductive segment partially oppose each other, said segment holder having a first position where the top of said conductive segment is located above the top of said stationary conductor and a second position where the top of said conductive segment is located below the top of said stationary conductor;
- a plurality of contact wires fixedly supported by said casing so as to extend therefrom in a direction substantially perpendicular to the direction of elongation of said conductive segment, said contact wires being arranged in spaced relation to one another along said direction of elongation of said conductive segment, one end portion of each of said contact wires being resiliently pressed against at least one of said conductive segment and said stationary conductor and the other end portions of said contact wires protruding outside said casing to serve as terminals, at least one of said contact wires being in electrical contact with said conductive segment when said segment holder is in said first position and makes electrical contact with said stationary conductor when said segment holder is in said second position, and at least another one of said contact wires always pressing against said conductive segment to urge said segment holder toward its second position; and
- driving means formed on the outer end face of said segment holder for receiving an external force from the outside of said casing to move said segment holder to said first position against the urging force of said contact wires thereby to make or break electrical contact between said contact wires through either one of said conductive segment and said stationary conductor.

21. A switch according to claim 1, 2, 3, 7 or 8, including an actuator movable into and out of said casing, said actuator when pushed into said casing being engageable with said driver to cause said segment holder to be turned against the biasing force applied thereto.

* * * * *